US008812788B2

(12) United States Patent
Solina, II et al.

(10) Patent No.: US 8,812,788 B2
(45) Date of Patent: Aug. 19, 2014

(54) VIRTUAL CACHE WINDOW HEADERS FOR LONG TERM ACCESS HISTORY

(75) Inventors: David H. Solina, II, Oviedo, FL (US); Mark Ish, Atlanta, GA (US)

(73) Assignee: LSI Corporation, San Jose, CA (US)

( * ) Notice: Subject to any disclaimer, the term of this patent is extended or adjusted under 35 U.S.C. 154(b) by 426 days.

(21) Appl. No.: 13/215,645

(22) Filed: Aug. 23, 2011

(65) Prior Publication Data

US 2012/0117324 A1     May 10, 2012

Related U.S. Application Data

(60) Provisional application No. 61/411,605, filed on Nov. 9, 2010.

(51) Int. Cl.
| G06F 12/00 | (2006.01) |
| G06F 13/00 | (2006.01) |
| G06F 13/28 | (2006.01) |
| G06F 12/08 | (2006.01) |

(52) U.S. Cl.
CPC ........ *G06F 12/0866* (2013.01); *G06F 12/0868* (2013.01); *G06F 12/0871* (2013.01)
USPC .......................................... 711/133; 711/118

(58) Field of Classification Search
CPC ............ G06F 12/0866; G06F 12/0868; G06F 12/0871; G06F 12/122
USPC .................................................. 711/118, 133
See application file for complete search history.

(56) References Cited

U.S. PATENT DOCUMENTS

| 6,487,638 | B2 | 11/2002 | Dawkins et al. | 711/133 |
| 6,738,865 | B1* | 5/2004 | Burton et al. | 711/133 |
| 6,883,064 | B2 | 4/2005 | Yoshida et al. | 711/114 |
| 7,743,216 | B2 | 6/2010 | Lubbers et al. | 711/137 |
| 7,793,065 | B2 | 9/2010 | Gill et al. | 711/171 |
| 2005/0060498 | A1 | 3/2005 | Curtis | 711/134 |
| 2005/0114608 | A1* | 5/2005 | Oshima et al. | 711/137 |
| 2010/0095070 | A1* | 4/2010 | Okawara et al. | 711/137 |
| 2010/0100604 | A1 | 4/2010 | Fujiwara et al. | 709/213 |
| 2010/0199043 | A1 | 8/2010 | Sechrest et al. | 711/118 |

* cited by examiner

*Primary Examiner* — Ryan Bertram
(74) *Attorney, Agent, or Firm* — Christopher P. Maiorana, PC

(57) ABSTRACT

A method of virtual cache window headers for long term access history is disclosed. The method may include steps (A) to (C). Step (A) may receive a request at a circuit from a host to access an address in a memory. The circuit generally controls the memory and a cache. Step (B) may update the access history in a first of the headers in response to the request. The headers may divide an address space of the memory into a plurality of windows. Each window generally includes a plurality of subwindows. Each subwindow may be sized to match one of a plurality of cache lines in the cache. A first of the subwindows in a first of the windows may correspond to the address. Step (C) may copy data from the memory to the cache in response to the access history.

20 Claims, 7 Drawing Sheets

VIRTUAL CACHE WINDOW HEADERS FOR LONG TERM ACCESS HISTORY

This application claims the benefit of U.S. Provisional Application No. 61/411,605, filed Nov. 9, 2010 and is hereby incorporated by reference in its entirety.

FIELD OF THE INVENTION

The present invention relates to data caches generally and, more particularly, to a method and/or apparatus for implementing virtual cache window headers for long term access history.

BACKGROUND OF THE INVENTION

Effective leveraging of solid state disk drives as a data cache is dependent on accurate detection and retention of frequently accessed data. A challenging aspect is to find the frequently accessed data by observing only a stream of host commands coming from an operating system to a controller of a redundant array of independent disks. Once detected, the data is loaded into the cache for higher performance on subsequent requests. However, if the data is infrequently accessed, cache space is wasted and performance negatively impacted because loading the infrequently access data into the cache represents additional operations.

It would be desirable to implement virtual cache window headers for long term access history.

SUMMARY OF THE INVENTION

The present invention generally concerns a method of virtual cache window headers for long term access history. The method may include steps (A) to (C). Step (A) may receive a request at a circuit from a host to access an address in a memory. The circuit generally controls the memory and a cache. Step (B) may update the access history in a first of the headers in response to the request. The headers may divide an address space of the memory into a plurality of windows. Each window generally includes a plurality of subwindows. Each subwindow may be sized to match one of a plurality of cache lines in the cache. A first of the subwindows in a first of the windows may correspond to the address. Step (C) may copy data from the memory to the cache in response to the access history.

The objects, features and advantages of the present invention include providing a method and/or apparatus for implementing virtual cache window headers for long term access history that may (i) trace cache access history, (ii) use cache header meta data to track input/output accesses beyond what is stored in the cache, (iii) provide a spatio-temporal historical record of all accesses to the storage underlying the cache, (iv) actively avoid loading unnecessary data in the cache, (v) allow for better cache efficiency and/or (vi) operate with large caches.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Some embodiments of the present invention generally facilitate tracking of large spaces of disk memory that may not actually be backed by a cache memory. The tracking may allow for low-overhead detection of hot (e.g., frequently accessed) data. The tracking may also mitigate penalties caused by loading infrequently accessed data into the cache memory. By allocating window headers that cover more memory space than exists in an actual physical cache memory, several advantages arise. For example, the tracking generally permits efficient detection of hot data from a stream of operating system accesses. The tracking may also help prevent pollution of the cache by non-hot data. The virtual cache headers generally allow for a very large space to be tracked (e.g., much larger that the amount of memory allocated for the cache) thereby facilitating (i) hotspot detection of isolated data areas not detectable in a simple least recently used (e.g., LRU) backed cache and (ii) mitigating a penalty of populating the cache when data is not hot.

Figure 1:
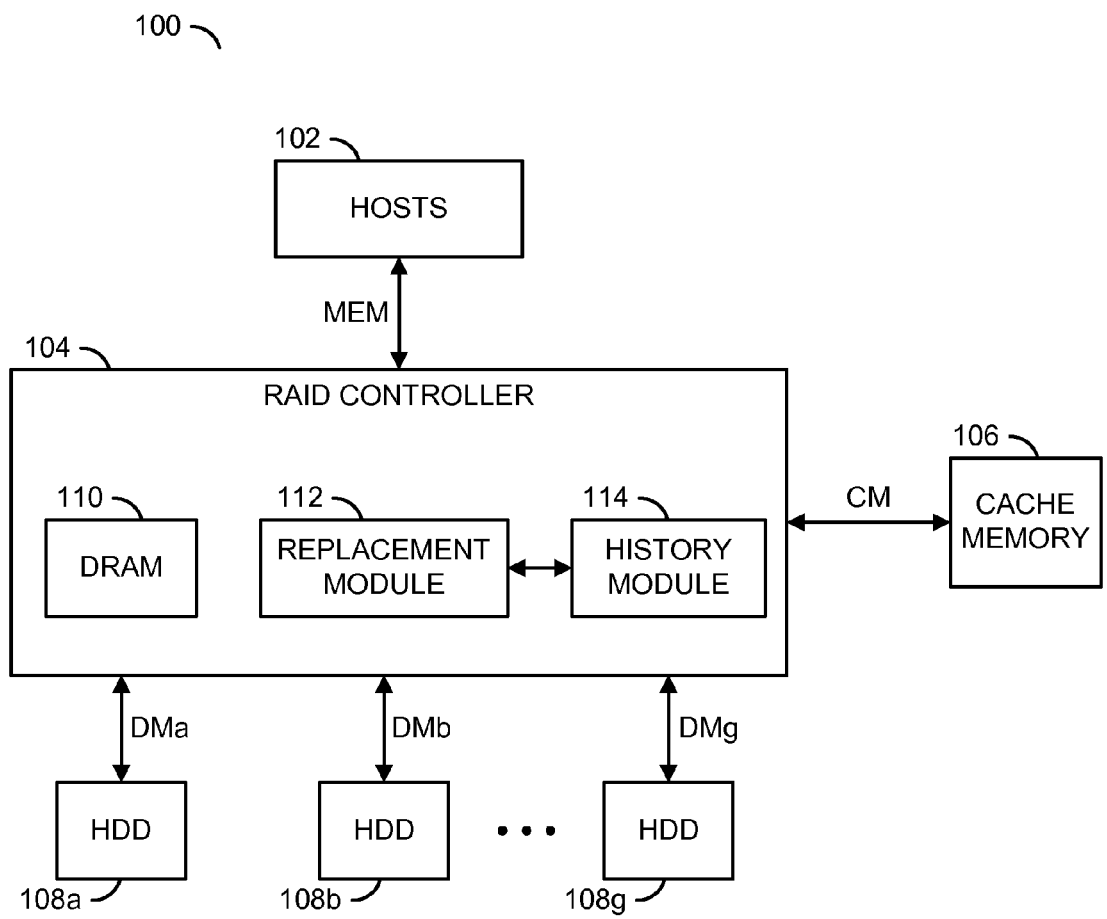
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or circuit or device or integrated circuit) 100 may implement virtual cache window headers for long term access history. The apparatus 100 generally comprises one or more blocks (or circuits) 102, a block (or circuit) 104, a block (or circuit) 106 and one or more blocks (or circuits) 108a-108g. In some embodiments, the circuit 106 may part of the circuit 104. The circuit 104 generally comprises a block (or circuit) 110, a block (or circuit) 112 and a block (or circuit) 114. The circuits 102-114 may represent modules and/or blocks that may be implemented as hardware, software, a combination of hardware and software, or other implementations.

A memory signal (e.g., MEM) may be exchanged between the circuit 102 and the circuit 104. A cache memory signal (e.g., CM) may be exchanged between the circuit 104 and the circuit 106. The circuit 104 may exchange disk memory signals (e.g., DMa-Dmg) with the circuits 108a-108g.

The circuit 102 may implement one or more host circuits. Each circuit 102 is generally operational to present access requests to the circuit 104 via the signal MEM. The access requests may include, but are not limited to, read accesses and write accesses. Each read access may include a memory address from which data is to be read. Each write access may include both data and a memory address at which the data is to be stored. The addresses may be in the form of logical block addresses (e.g., LBAs). Other addressing schemes may be implemented to meet the criteria of a particular application.

The circuit 104 may implement a redundant array of independent disks (e.g., RAID) controller circuit. The circuit 104 is generally operational to process the access requests received via the signal MEM to store and read data to and from a mass storage device (e.g., the circuits 108a-108g). The circuit 104 may be configured to operate in a RAID 0, RAID 1, RAID 2, RAID 3, RAID 4, RAID 5, RAID 6, RAID 0+1, RAID 1+0 and/or RAID 5+1 configurations. The circuit 104 may also configure the mass storage to operate as one or more virtual disks (or virtual memories).

The circuit 104 may include cache operations using either an internal cache memory or the circuit 106. The cache operations may include generating an access (or trace) history of all access requests received from the circuit 102. One or more requests may be received by the circuit 104 from the from the circuit 102 to access an address in circuits 108a-108g. The circuit 104 may update the access histories in corresponding window headers in response to the access requests. The circuit 104 may be configured to control the circuits 108a-108g and the circuit 106 to copy data from the circuits 108a-108g to the circuit 106 in response to the access histories. The window headers may divide an address space of the circuits 108a-108g into a plurality of windows. Each window generally comprises a plurality of subwindows. Each subwindow may be sized to match a cache line in the circuit 106. Each subwindow may corresponds to one or more of the addresses.

The circuit 106 may implement a cache memory circuit. The circuit 106 is generally operational to buffer data received from the circuit 104 via the signal CM. The buffered data may be arranged as multiple cache lines. The data in the cache lines may be transferred to the circuit 104 via the signal CM. In some embodiments, the circuit 106 may be implemented as a sold state drive. Common sizes of a solid state drive may range from 1 to 2 terabytes. In other embodiments, the circuit 106 may be implemented as a double data rate (e.g., DDR) memory circuit. Common sizes of a DDR memory may range from 1 to 64 gigabytes.

Each circuit 108a-108g may implement a hard disk drive (e.g., HDD) circuit. The circuits 108a-108g are generally operational to store data for the circuit 102. The data may be received from the circuit 104 and sent to the circuit 104 via the respective signals DMa-DMg. Collectively, the circuits 108a-108g may form a mass storage device. A common size of the mass storage device may range from a several terabytes to a few petabytes. The mass storage device may be arranged as one or more virtual devices (or virtual disks), as see from the circuit 102. In some embodiments, the circuits 108a-108g may be implemented as magnetic disk drives. Other memory technologies may be implemented in the circuits 108a-108g to meet the criteria of a particular application.

The circuit 110 may implement a dynamic random access memory (e.g., DRAM) circuit. The circuit 110 may be operational to store the window headers (e.g., access histories) generated by the circuit 104. In some embodiments, the circuit 110 may also implement a cache memory used to cache data in transit to and from the circuits 108a-108g.

The circuit 112 may implement a replacement module. The circuit 112 is generally operational to determine (i) when and which sets of data should be stored in the cache (e.g., the circuit 106 or the circuit 110) and (ii) when and which sets of data should be removed from in the cache. A store/remove (replacement) decision implemented by the circuit 112 may utilize the access history generated by the circuit 104. Generally, hot (e.g., frequently accessed) data identified by the access history may be populated in the cache. Infrequently access data may be kept out of the cache to avoid performance penalties incurred by moving the infrequent data into the cache. Standard replacement decision techniques generally include, but are not limited to, a least recently used replacement policy, a not frequently used replacement policy and an aging replacement policy. Other replacement decision policies may be implemented to meet the criteria of a particular application.

The circuit 114 may implement a history module. The circuit 114 is generally operational to create the access histories from the access requests received from the circuit 102. The circuit 114 may generate the access histories by mapping the address space of the circuits 108a-108g into a fixed size granularity called windows. Each window generally tracks the granularity worth of host space accesses. An additional granularity underneath each window may be referred to as a subwindow (or subwindow extent). Each subwindow may be associated with one or more addresses (e.g., LBAs). Each subwindow may also represent (or match) a cache line granularity. At different times, the various windows and subwindows may or may not be associated with data in the actual cache. Windows without any associated cache data may be referred to as virtual window headers.

Many more window headers may be allocated across the address space of the circuits 108a-108g than exists in the physical cache (e.g., the DDR cache or the SSD cache). Covering the address space of the circuits 108a-108g generally allows for large regions of host accesses to be tracked even though the cache is not involved in many of the host accesses. The access histories generally provide detailed information about host access patterns.

Figure 2:
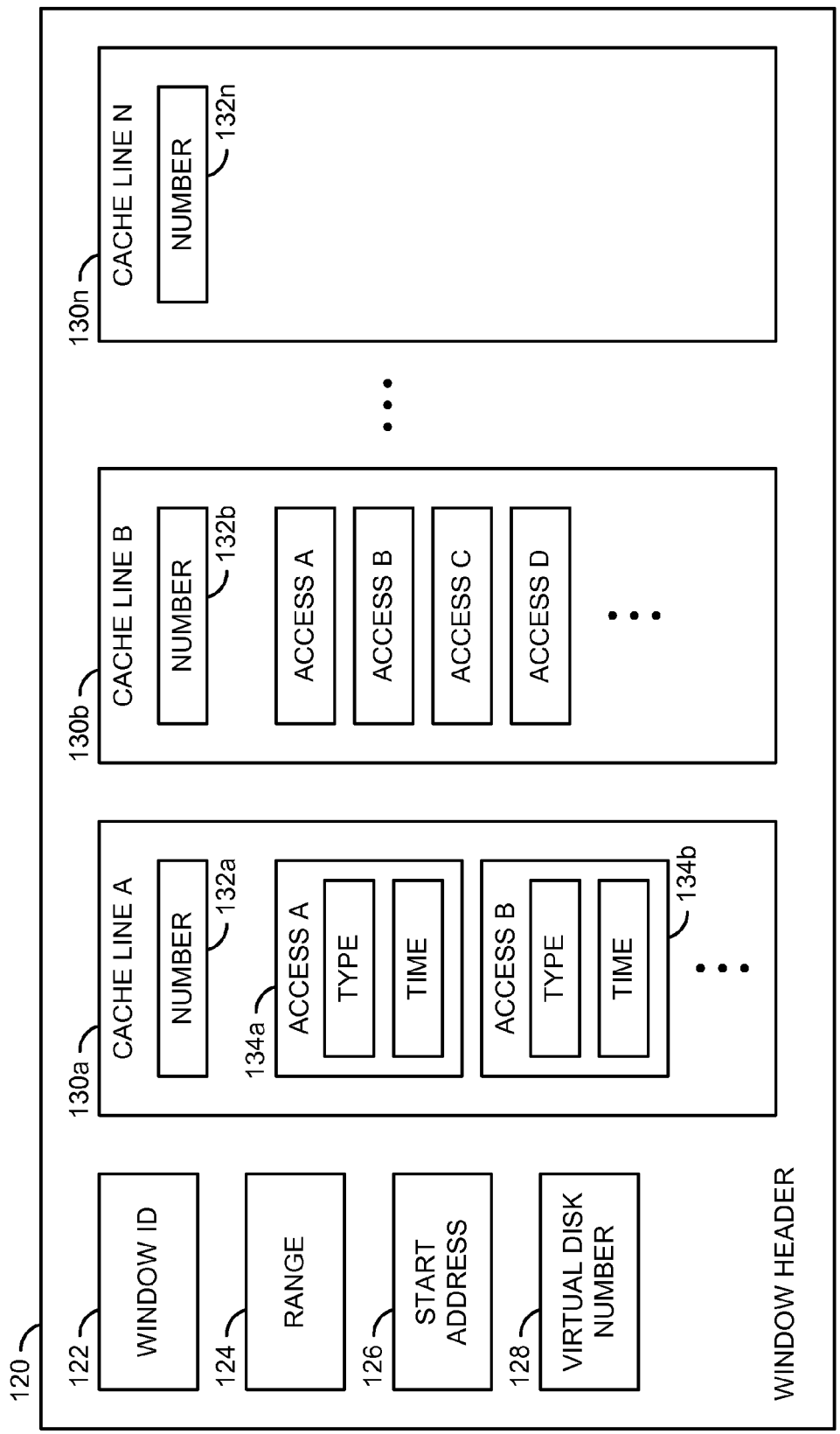
FIG. 2 is a diagram of an example implementation of a window header.

Referring to FIG. 2, a diagram of an example implementation of a window header 120 is shown. The window header 120 may be generated by the circuit 114 and stored in the circuit 110. Each window header 120 generally comprises a parameter (or field) 122, a parameter (or field) 124, a parameter (or field) 126, a parameter (or field) 128 and multiple parameters (or fields) 130a-130n. Each window header 120 may have a fixed size that spans a fixed amount (e.g., 1 megabyte of data or 2048 LEAS at 512 bytes/block) of the address space of the circuits 108a-108g. Other sizes of the window headers 120 may be implemented to meet the criteria of a particular application. A size of each window header 120 may be a power of 2 such that the headers are easily shifted and/or aligned in memory (e.g., circuit 110). Adjoining windows may not overlap.

The field 122 may implement a window identity field. The field 122 may provide a unique identifier of the corresponding window header 120 to allow the circuit 114 to distinguish among the various window headers 120.

The field 124 may implement a range field. The field 124 generally defines a range of addresses (e.g., LBAs) covered by the corresponding window header 120.

The field 126 may implement a start address field. The field 126 generally establishes a starting address (e.g., a particular LBA) of the corresponding window header 120.

The field 128 may implement a virtual disk number field. The field 128 may store an identification number of a virtual disk for which the window is established.

Each field 130a-130n may implement a subwindow field. Each field 130a-130n may store a corresponding count number field 132a-132n and zero to several elements 134a-134b. Each field 130a-130n may represent a portion of the address space of the circuits 108a-108g. Adjoining subwindows may not overlap. Each field 130a-130n may also match a cache line in terms of size. For example, if a cache line may hold data for N addresses (e.g., 32 LBAs), each field 130a-130n may cover an address space of the N addresses.

Each field 132a-132n may implement a count field. Each field 132a-132n may store a count of the number of access requests made by the circuit 102 into the address range covered by the corresponding field (subwindow) 130a-130n. In some embodiments, the count may be a running count of all access requests. In other embodiments, the count may be a limited count of the number of access requests made within a given time frame (e.g., 0.1 seconds, 1 second, 1 minute, etc.).

Each element 134a-134b may implement an access element (or indicator). For each access request received by the circuit 104, an element 134a-134b may be generated in the appropriate field 130a-130n of the subwindow corresponding to the memory address received in the access request. When created, each element 134a-134b may include a type of the access request (e.g., a read access or a write access) and a time that the access request was received by the circuit 104. Every host access request may generate a cache window header access element 134a-134b regardless of whether or not the cache is populated for the access request (e.g., independent of a cache hit or a cache miss). The various fields 130a-130n in each window header 120 may have different numbers of the elements 134a-134b in response to the number and locations (e.g., addresses) of the access requests.

Figure 3:
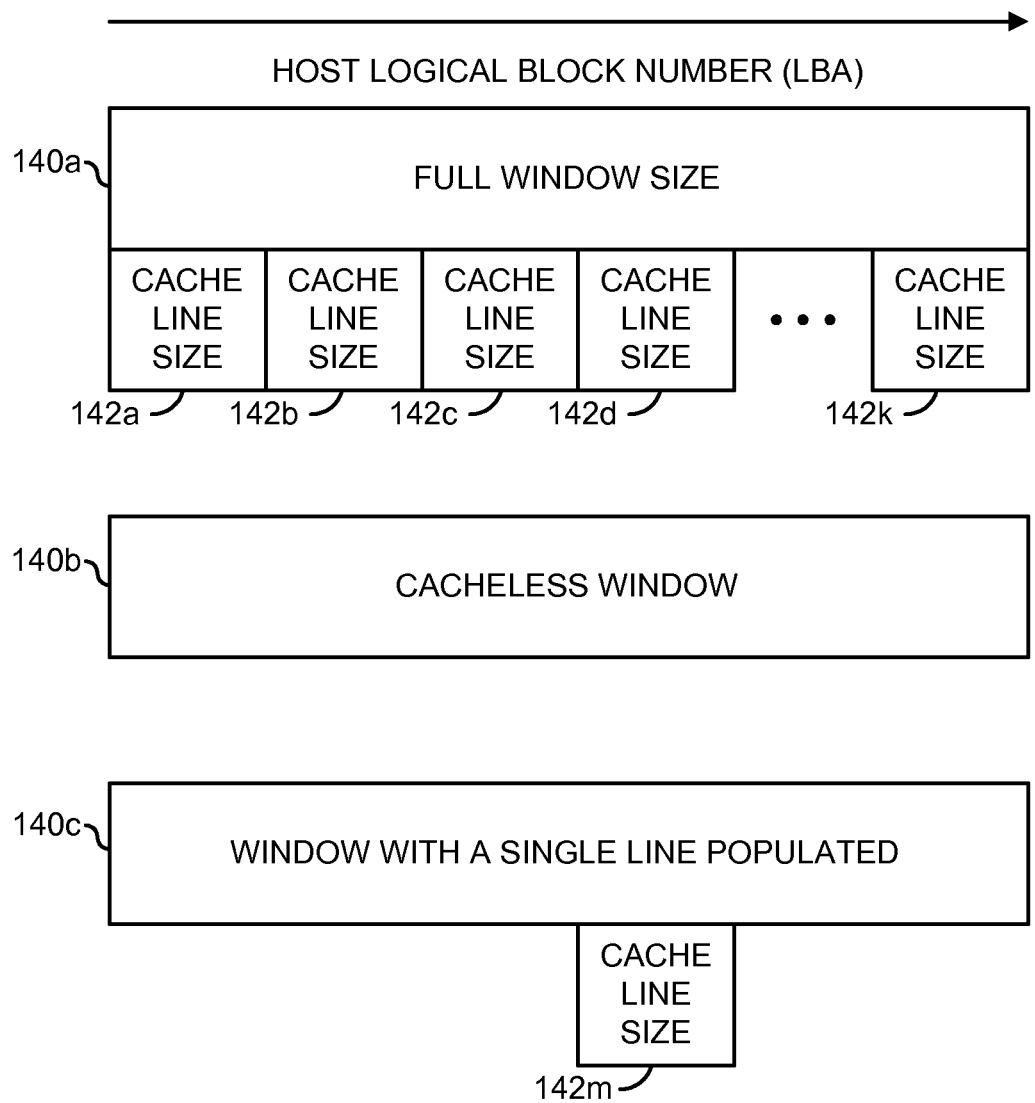
FIG. 3 is a block diagram of example multiple window headers relative to multiple cache lines.

Referring to FIG. 3, a block diagram of example multiple window headers 140a-140c relative to multiple cache lines is shown. The block diagram generally illustrates relationships between a window size granularity and a cache granularity. Each window header 140a-140c may be representative of the window header 120. The example window header 140a generally illustrates a full header. All of the subwindow fields 130a-130n in the window header 140a may correspond to addresses that are currently buffered in respective cache lines 142a-142k of the cache. Therefore, any access request initiated by the circuit 102 into the address space covered by the window header 140a may result in a cache hit.

The example window header 140b generally illustrates an empty header. None of the subwindow fields 130a-130n in the window header 140b may correspond to an address that is currently buffered in the cache. The window header 140b is not backed by the physical cache so the window header 140b may be referred to as a virtual window header. All access requests initiated by the circuit 102 into the address space covered by the virtual window header 140b may result in a cache miss.

The example window header 140c generally illustrates a partially full header. Some subwindow fields 130a-130n (e.g., a single subwindow in the example) may correspond to an address that is currently buffered in the cache line 142m. The other subwindow fields 130a-130n may correspond to addresses not currently buffered in the cache. As such, some access requests initiated by the circuit 102 into the window 140c may result in a cache hit and other access requests may result in a cache miss.

Figure 4:
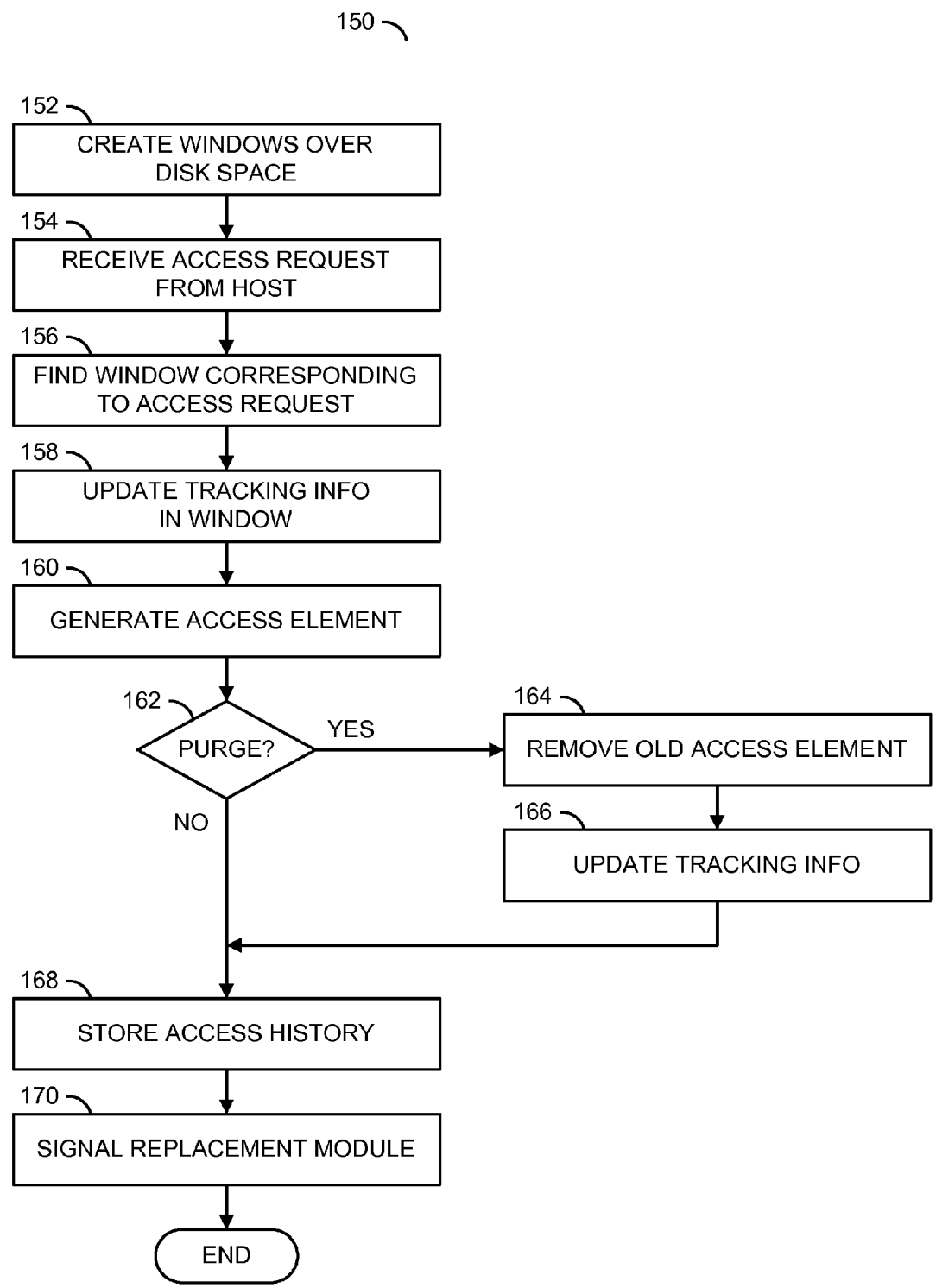
FIG. 4 is a flow diagram of an example method for updating access history.

Referring to FIG. 4, a flow diagram of an example method 150 for updating the access history is shown. The method (or process) 150 may be implemented by the circuit 104. The method 150 generally comprises a step (or state) 152, a step (or state) 154, a step (or state) 156, a step (or state) 158, a step (or state) 160, a step (or state) 162, a step (or state) 164, a step (or state) 166, a step (or state) 168 and a step (or state) 170. The steps 152-170 may represent modules and/or blocks that may be implemented as hardware, software, a combination of hardware and software, or other implementations.

In the step 152, the circuit 114 may create multiple window headers that divide the address space of the circuits 108a-108g or the resulting virtual disks. Each window header generally represents a portion of the address space. In some embodiments, the entire address space may be covered by the window headers. In other embodiments, a subset of the address space may be covered by the window headers at any given time.

In the step 154, the circuit 104 may receive an access request from the circuit 102. The access request may be presented to the circuit 114 to determine which window header and which subwindow is associated with the memory address (e.g., LBA) received in the access request per the step 156. In situations where the circuit 102 is implemented as two or more hosts, an identify of the sending host may be disregarded for purposes of the tracking information. If a new window is created for tracking the access request, an oldest virtual window header (e.g., the LRU virtual window header) may be examined and reused if the oldest virtual window header is not determined to be useful anymore.

The tracking information (e.g., the count number) in the subwindow associated with the received memory address may be updated in the step 158 by the circuit 114. Updating the tracking information may also include creating a new element in the associated subwindow to record the access request in the step 160. The element may indicate the type of access request and the time at which the access request was received.

In the step 162, the circuit 114 may determine if one or more older elements should be purged from the associated subwindow and/or window header. A variety of techniques may be used to determine when to purge and when not to purge an old element. For example, any element created more than a set amount of time before the current time may be considered stale and thus should be removed. In another example, if the newly added element fills the capacity of the subwindow, the oldest element may be removed (e.g., first in first out). Other purge techniques may be implemented to meet the criteria of a particular application. Once the older elements have been removed in the step 164, the tracking information (e.g., count number) of the subwindow may be updated by the circuit 114 in the step 166. The method 150 may continue with the step 168.

If no elements should be removed, or purging of elements is not implemented by a particular application, the circuit 114 may store the updated access (trace) history in the circuit 110 per the step 168. The circuit 114 may signal the circuit 112 in the step 170 that the updated access history has been posted. Once the circuit 114 has signaled to the circuit 112, the method 150 may end and wait for the next access request from the circuit 102.

Figure 5:
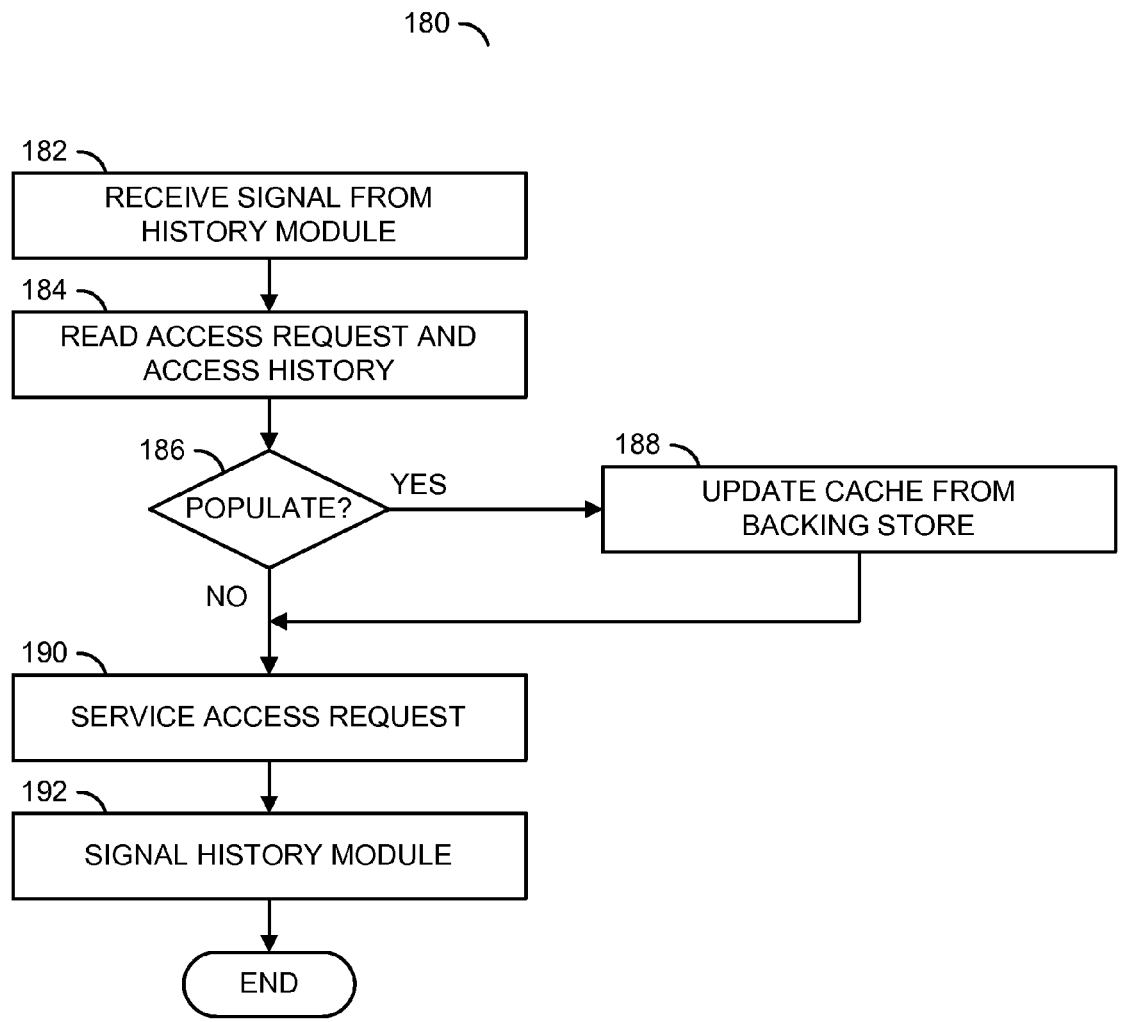
FIG. 5 is a flow diagram of an example method for updating a cache.

Referring to FIG. 5, a flow diagram of an example method 180 for updating the cache is shown. The method (or process) 180 may be implemented by the circuit 104. The method 180 generally comprises a step (or state) 182, a step (or state) 184, a step (or state) 186, a step (or state) 188, a step (or state) 190 and a step (or state) 192. The steps 182-192 may represent modules and/or blocks that may be implemented as hardware, software, a combination of hardware and software, or other implementations.

In the step 182, the circuit 112 may receive the signal from the circuit 114 indicating that the updated access history is available in the circuit 110. The circuit 112 may read the access history and the received access request in the step 184. In the step 186, the circuit 112 may determine if one or more cache lines should be populated from the circuits 108a-108g in response to the access request. The determination may be made, at least in part, based on the tracking information available in the corresponding window header and subwindow. For example, if the tracking information shows that a recent number of access requests to the corresponding subwindow exceeds a threshold count, a flag may be raised. The replacement policy implemented by the circuit 112 may thus conclude that the cache should be populated due to the access request and the access history. Other replacement policies may be implemented to meet the criteria of the particular application.

Where the replacement policy decides to populate the cache in response to the access request, the circuit 112 may copy a cache line containing the requested memory address from the circuits 108*a*-108*g* to the cache in the step 188. The method 180 may continue with the step 190.

Where the replacement policy decides not to populate the cache, the requested memory address is already available in the cache (e.g., a cache hit) or the requested data was recently retrieved from the circuits 108*a*-108*g* (e.g., step 188), the circuit 112 may service the access request in the step 190. In the step 192, the circuit 112 may signal to the circuit 114 the results of the replacement policy.

Figure 6:
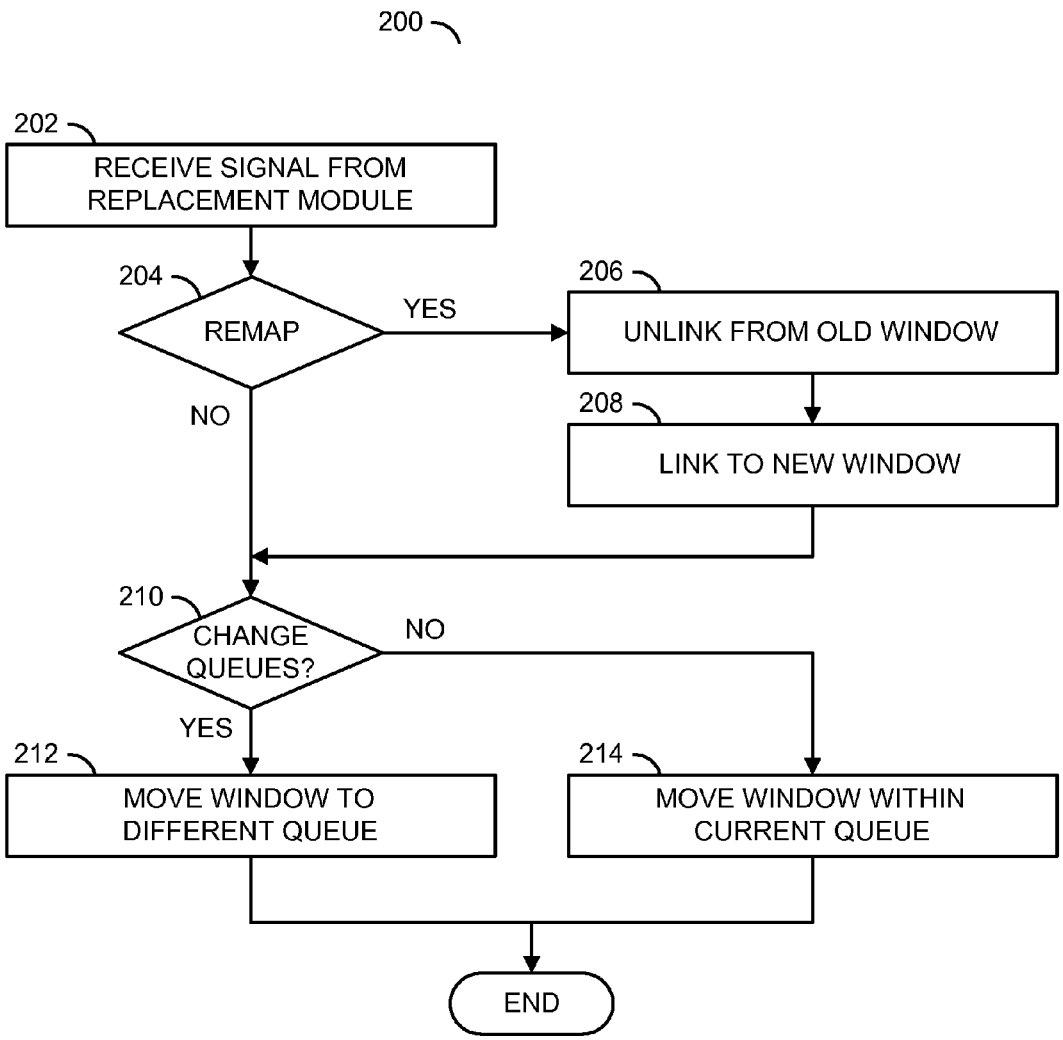
FIG. 6 is a flow diagram of an example method for updating the window headers.

Referring to FIG. 6, a flow diagram of an example method 200 for updating the window headers is shown. The method (or process) 200 may be implemented by the circuit 104. The method 200 generally comprises a step (or state) 202, a step (or state) 204, a step (or state) 206, a step (or state) 208, a step (or state) 210, a step (or state) 212 and a step (or state) 214. The steps 202-214 may represent modules and/or blocks that may be implemented as hardware, software, a combination of hardware and software, or other implementations.

In the step 202, the circuit 114 may receive the signal from the circuit 112 indicating that the access request has been serviced. The circuit 114 may consider if one or more cache lines were populated or not from the circuits 108*a*-108*g* while servicing the access request in the step 204. If old data in the cache lines was replaced by new data from the circuits 108*a*-108*g*, the circuit 114 may remap links for the cache lines from the old window headers to the new window headers. In the step 206, the circuit 114 may unlink the cache lines from the old window headers that corresponds to the old data (or memory addresses) removed from the cache. In the step 208, the circuit 114 may link the cache lines to the new window headers that cover the new data (or memory addresses) copied into the cache. The method 200 may continue with the step 210.

If no remapping was performed or if some cache lines were changed while servicing the access request, the circuit 114 may determine in the step 210 if any of the window headers should be changed between two or more queues (or lists). Consider by way of example a virtual window header that had no links to the actual cache lines before the access request. Such a virtual window header may be stored in a cacheless-type queue. If servicing the request causes the virtual window header to acquire one or more links to one or more cache lines, the circuit 114 may move the window header from the cacheless-type queue to a cached-type queue in the step 212. Likewise, if servicing the access request breaks all links between a window header in the cached-type queue, the circuit 114 may move the window header into a most recently used (e.g., MRU) position in the cacheless-type queue in the step 212.

If servicing the access request does not pull the window header from the cacheless-type queue or move the window header into the cacheless-type queue, the circuit 114 may move the window header within a current queue (e.g., the cacheless-type queue or the cached-type queue) in the step 214. For example, the window header spanning the address space of the just-serviced access request may be moved to a most recently used (e.g., MRU) position in the current queue. Once the window headers are properly placed in the proper queues, the method 200 may end and wait for the next access request from the circuit 102.

Figure 7:
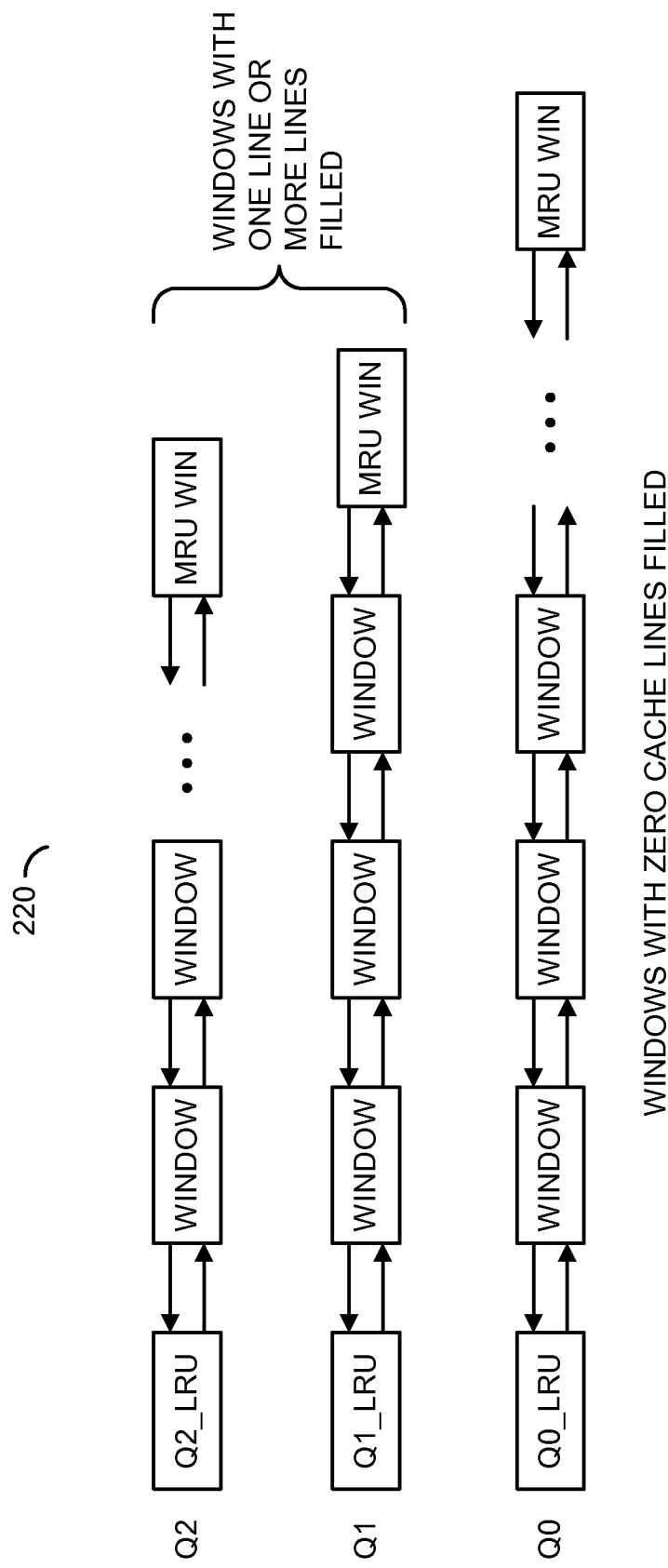
FIG. 7 is a block diagram of an example set of queues for the window headers.

Referring to FIG. 7, a block diagram of an example set 220 of queues for the window headers is shown. The diagram generally illustrates the relationships between windows with links to the cache lines and widows without links to the cache lines. The set 220 generally comprises multiple queues (or lists) Q0, Q1 and Q2. The queue Q0 may be used to organize the virtual window headers (e.g., 140*b*) that have no corresponding data in the physical cache. The queue Q1 may be used to organize the window headers (e.g., 140*c*) having some subwindows that correspond to data in the physical cache. The queue Q2 may be used to organize the window headers (e.g., 140*a*) having all subwindows correspond to data in the physical cache. Other numbers and/or arrangements of the queues may be implemented to meet the criteria of a particular application.

Although the use of the window headers has been described in terms of caching virtual disks for one or more hosts, the window headers may be used in other applications. For example, the window headers may be used to track queries into a database to determine where frequently accessed data is located. In another example, the window headers may be used in a trend analysis to locate high density areas for entries (e.g., reported flu cases) made into a grid array (e.g., a city or county map).

The functions performed by the diagrams of FIGS. 1-7 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method of virtual cache window headers for long term access history, comprising the steps of:
    (A) receiving a request at a circuit to access an address in a memory, wherein said circuit controls a cache;
    (B) updating said access history in a first of said headers in response to said request, wherein (i) said headers divide an address space of said memory into a plurality of windows, (ii) each of said windows comprises a plurality of subwindows, (iii) each of said subwindows is sized to match one of a plurality of cache lines in said cache and (iv) a first of said subwindows in a first of said windows corresponds to said address; and
    (C) copying data from said memory to said cache in response to said access history.

2. The method according to claim 1, further comprising the step of:
    linking a first of said cache lines to said first window in response to said first cache line being populated from said first window.

3. The method according to claim 1, further comprising the step of:
    unlinking a first of said cache lines from said first window in response to said first cache line being populated from a second of said windows.

4. The method according to claim 1, further comprising the step of:
    moving said first window into a queue where said first window is not linked to any of said cache lines.

5. The method according to claim 1, further comprising the step of:
    moving said first window from a first queue into a second queue in response to linking at least one of said cache lines to said first window.

6. The method according to claim 1, wherein said access history is updated by adding an element to said first subwindow.

7. The method according to claim 6, wherein said access history is updated by recording a type of said access in said element selected from (i) a read access and (ii) a write access.

8. The method according to claim 6, wherein said access history is updated by recording a time of said access in said element.

9. The method according to claim 1, wherein said access history is updated by incrementing a counter of said first subwindow in response to said access.

10. An apparatus comprising:
    a circuit configured to (i) control a cache, (ii) receive a request to access an address in a memory, (iii) update an access history in a first of a plurality of headers in response to said request and (iv) copy data from said memory to said cache in response to said access history, wherein (a) said headers divide an address space of said memory into a plurality of windows, (b) each of said windows comprises a plurality of subwindows, (c) each of said subwindows is sized to match one of a plurality of cache lines in said cache and (d) a first of said subwindows in a first of said windows corresponds to said address.

11. The apparatus according to claim 10, wherein said circuit is further configured to link a first of said cache lines to said first window in response to said first cache line being populated from said first window.

12. The apparatus according to claim 10, wherein said circuit is further configured to unlink a first of said cache lines from said first window in response to said first cache line being populated from a second of said windows.

13. The apparatus according to claim 10, wherein said circuit is further configured to move said first window into a queue where said first window is not linked to any of said cache lines.

14. The apparatus according to claim 10, wherein said circuit is further configured to move said first window from a first queue into a second queue in response to linking at least one of said cache lines to said first window.

15. The apparatus according to claim 10, wherein said access history is updated by adding an element to said first subwindow.

16. The apparatus according to claim 15, wherein said access history is updated by recording a type of said access in said element selected from (i) a read access and (ii) a write access.

17. The apparatus according to claim 15, wherein said access history is updated by recording a time of said access in said element.

18. The apparatus according to claim 10, wherein said access history is updated by incrementing a counter of said first subwindow in response to said access.

19. The apparatus according to claim 10, wherein said apparatus is implemented as one or more integrated circuits.

20. An apparatus comprising:
    means for receiving a request to access an address in a memory, wherein said means for receiving controls a cache;
    means for updating an access history in a first of a plurality of headers corresponding to said address in response to said request, wherein (i) said headers divide an address space of said memory into a plurality of windows, (ii) each of said windows comprises a plurality of subwindows, (iii) each of said subwindows is sized to match one of a plurality of cache lines in said cache and (iv) a first of said subwindows in a first of said windows corresponds to said address; and
    means for copying data from said memory to said cache in response to said access history.

* * * * *